(12) United States Patent
Liu

(10) Patent No.: US 9,776,575 B1
(45) Date of Patent: Oct. 3, 2017

(54) BICYCLE CARRIER

(71) Applicant: Yao-Huang Liu, Tainan (TW)

(72) Inventor: Yao-Huang Liu, Tainan (TW)

( * ) Notice: Subject to any disclaimer, the term of this patent is extended or adjusted under 35 U.S.C. 154(b) by 0 days.

(21) Appl. No.: 15/142,091

(22) Filed: Apr. 29, 2016

(51) Int. Cl.
*B60R 9/058* (2006.01)
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/10; B60R 9/06
USPC .................................. 224/329, 924
See application file for complete search history.

(56) References Cited

U.S. PATENT DOCUMENTS

| 4,830,250 | A | * | 5/1989 | Newbold | B60R 9/06 224/314 |
| 4,936,480 | A | * | 6/1990 | Apostolo | B60R 9/065 220/480 |
| 5,495,970 | A | * | 3/1996 | Pedrini | B60R 9/06 211/17 |
| 6,422,443 | B1 | * | 7/2002 | Erickson | B60R 9/06 224/492 |
| 8,025,196 | B2 | * | 9/2011 | Flaherty | B60R 9/06 224/532 |
| 8,444,032 | B2 | | 5/2013 | Pedrini | |
| 8,573,456 | B2 | * | 11/2013 | Farber | B60R 9/06 224/314 |
| 8,684,244 | B2 | * | 4/2014 | Pedrini | B60R 9/06 211/17 |
| 2002/0117524 | A1 | * | 8/2002 | Jeong | B60R 9/06 224/314 |
| 2006/0138186 | A1 | * | 6/2006 | Pedrini | B60R 9/06 224/497 |
| 2010/0127031 | A1 | * | 5/2010 | Sautter | B60R 9/10 224/500 |

* cited by examiner

*Primary Examiner* — Derek Battisti
(74) *Attorney, Agent, or Firm* — Alan D. Kamrath; Kamrath IP Lawfirm, P.A.

(57) ABSTRACT

A bicycle carrier includes a main shaft having a spacer, two upper stands mounted on the main shaft and abutting the spacer, two carrying racks mounted on the main shaft and respectively abutting the upper stands, two lower stands mounted on the main shaft and respectively abutting the carrying racks, and two end caps mounted on the main shaft and respectively abutting the lower stands. The spacer has two ends each provided with a first ratchet ring. Each of the upper stands has a first mounting ring which has two ends each provided with a second ratchet ring. Each of the carrying racks has a second mounting ring which has two ends each provided with a third ratchet ring. Each of the lower stands has a third mounting ring which has two ends each provided with a fourth ratchet ring.

5 Claims, 8 Drawing Sheets

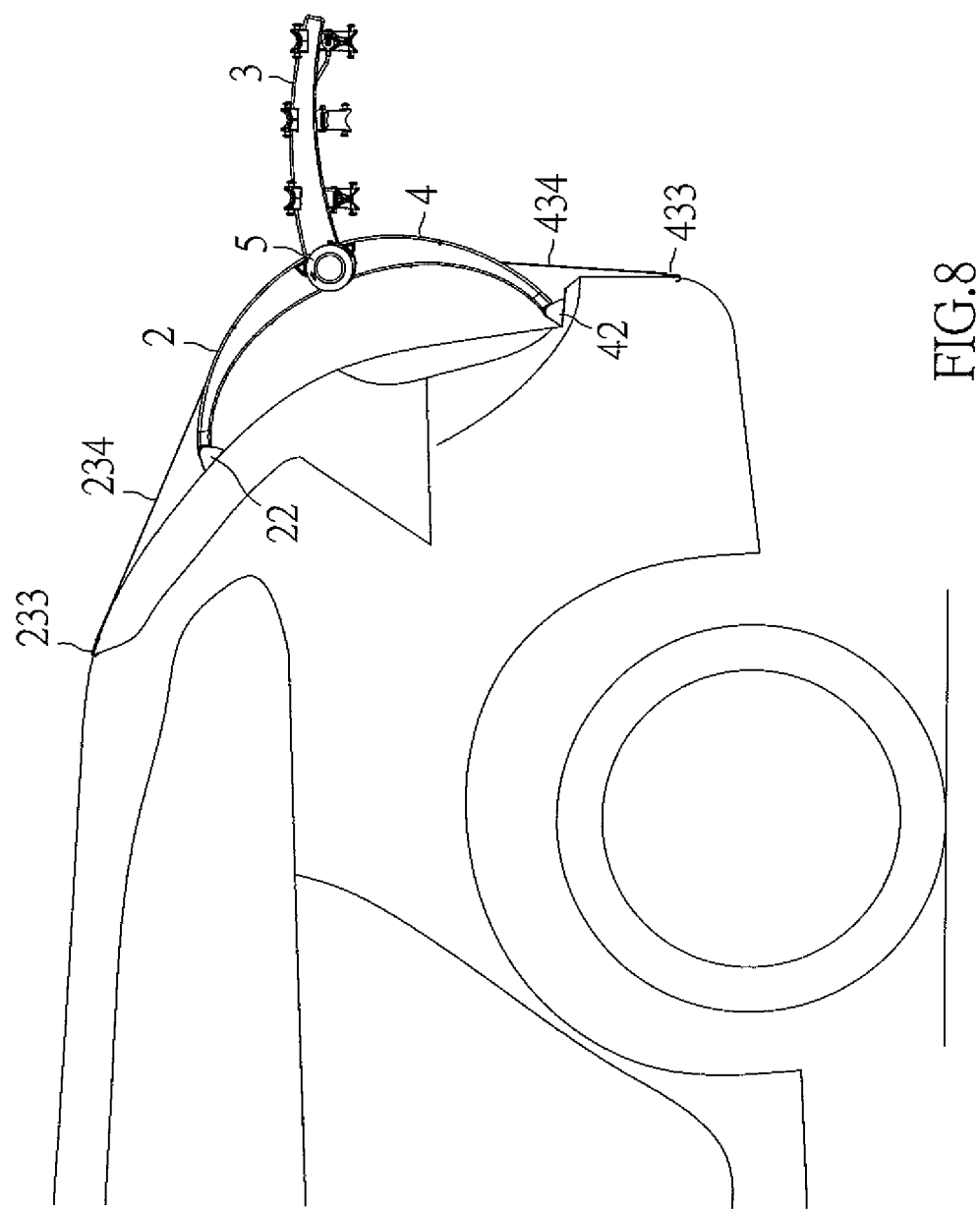

BICYCLE CARRIER

BACKGROUND OF THE INVENTION

1. Field of the Invention

The present invention relates to a carrier and, more particularly, to a carrier for a vehicle, such as a bicycle.

2. Description of the Related Art

The closest prior art reference of which the applicant is aware was disclosed in U.S. Pat. No. 8,444,032, filed on Oct. 3, 2011, entitled "COLLAPSIBLE VEHICLE-MOUNTED EQUIPMENT CARRIER", in which the bicycle carrier 110 comprises a hub 120, a first frame section 116, a second frame section 118, and a single support member 114. The hub 120 includes a central hub section 148, a pair of inner sections 147 and a pair of outer sections 146. The first frame section 116 is connected with the inner sections 147 of the hub 120. The second frame section 118 is connected with the central hub section 148 of the hub 120. The single support member 114 is connected with the outer sections 146 of the hub 120. A central pin 202 in turn extends through one of the outer sections 146, one of the inner sections 147, the central hub section 148, the other one of the inner sections 147 and the other one of the outer sections 146. An engagement member 204 is screwed onto the central pin 202. The central hub section 148 has two ends each provided with teeth, each of the inner sections 147 has two ends each provided with teeth, and each of the outer sections 146 has one end provided with teeth, so that the central hub section 148, the inner sections 147 and the outer sections 146 engage each other.

However, the central hub section 148, the inner sections 147 and the outer sections 146 of the hub 120 have different shapes and sizes so that the hub 120 has a complicated structure, thereby increasing the cost of fabrication and production. In addition, the central pin 202 is an elongate rod with a poor structural strength and cannot withstand the large load of the outer sections 146, the inner sections 147 and the central hub section 148, so that the central pin 202 is easily broken or worn out during a long-term utilization, thereby failing the hub 120. Further, the first frame section 116 is connected with the inner sections 147 of the hub 120, the second frame section 118 is connected with the central hub section 148 of the hub 120, the single support member 114 is connected with the outer sections 146 of the hub 120, and the central pin 202 in turn extends through one of the outer sections 146, one of the inner sections 147, the central hub section 148, the other one of the inner sections 147 and the other one of the outer sections 146, so that the hub 120 is not assembled easily and quickly, thereby increasing the working time and energy of assembly.

BRIEF SUMMARY OF THE INVENTION

In accordance with the present invention, there is provided a bicycle carrier comprising a main shaft having a middle section provided with a spacer, at least two upper stands mounted on the main shaft and abutting the spacer of the main shaft, at least two carrying racks mounted on the main shaft and respectively abutting the at least two upper stands, at least two lower stands mounted on the main shaft and respectively abutting the at least two carrying racks, and at least two end caps mounted on the main shaft and respectively abutting the at least two lower stands. The main shaft is a hollow tube and has two ends each provided with two guiding grooves. The spacer of the main shaft has two ends each provided with a first ratchet ring. Each of the at least two upper stands has a first end provided with a first mounting ring, a second end provided with a first abutting portion, and a side provided with a first tightening unit. The first mounting ring has an interior provided with a first through hole mounted on the main shaft and has two ends each provided with a second ratchet ring corresponding to the respective first ratchet ring of the spacer. Each of the at least two carrying racks has an end provided with a second mounting ring and has a face provided with at least one carrying portion. The second mounting ring has an interior provided with a second through hole mounted on the main shaft and has two ends each provided with a third ratchet ring corresponding to the respective second ratchet ring of the first mounting ring. Each of the at least two lower stands has a first end provided with a third mounting ring, a second end provided with a second abutting portion, and a side provided with a second tightening unit. The third mounting ring has an interior provided with a third through hole mounted on the main shaft and has two ends each provided with a fourth ratchet ring corresponding to the respective third ratchet ring of the second mounting ring. Each of the at least two end caps has an interior provided with two projections corresponding to the two respective guiding grooves of each of the two ends of the main shaft.

Preferably, the first tightening unit includes a first receiving chamber formed in each of the at least two upper stands, a first cord winding arm mounted in the first receiving chamber, a first pull cord retractably mounted on each of the at least two upper stands and having a distal end provided with a first hook portion, and a first cover pivotally mounted on each of the at least two upper stands and having a first lock core. The first cover covers the first receiving chamber to cover and hide the first cord winding arm in the first receiving chamber.

Preferably, the second tightening unit includes a second receiving chamber formed in each of the at least two lower stands, a second cord winding arm mounted in the second receiving chamber, a second pull cord retractably mounted on each of the at least two lower stands and having a distal end provided with a second hook portion, and a second cover pivotally mounted on each of the at least two lower stands and having a second lock core. The second cover covers the second receiving chamber to cover and hide the second cord winding arm in the second receiving chamber.

Preferably, each of the two ends of the main shaft is provided with two first pin holes located between the two guiding grooves, each of the at least two end caps is provided with two second pin holes located between the two projections, and the bicycle carrier further comprises at least two positioning pins extending through the respective two second pin holes of each of the at least two end caps and the respective two first pin holes of each of the two ends of the main shaft.

Preferably, each of the at least two upper stands is pivotally connected with the first abutting portion.

Preferably, each of the at least two lower stands is pivotally connected with the second abutting portion.

According to the primary advantage of the present invention, the two projections of each of the at least two end caps are inserted into the two respective guiding grooves of each of the two ends of the main shaft, so that the spacer of the main shaft, the first mounting ring of each of the at least two upper stands, the second mounting ring of each of the at least two carrying racks and the third mounting ring of each of the at least two lower stands abut and engage each other.

According to another advantage of the present invention, the first ratchet ring of the spacer of the main shaft, the second ratchet ring of the first mounting ring of each of the at least two upper stands, the third ratchet ring of the second mounting ring of each of the at least two carrying racks and the fourth ratchet ring of the third mounting ring of each of the at least two lower stands engage each other, so that each of the at least two upper stands, each of the at least two carrying racks and each of the at least two lower stands are positioned on the main shaft solidly and stably.

According to a further advantage of the present invention, the clamping angle between each of the at least two upper stands and each of the at least two lower stands can be adjusted to conform to the shape of the trunk of the car, thereby enhancing the versatility of the bicycle carrier.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 8 is a schematic side operational view of the bicycle carrier for a sport utility vehicle.

DETAILED DESCRIPTION OF THE INVENTION

Figure 1:
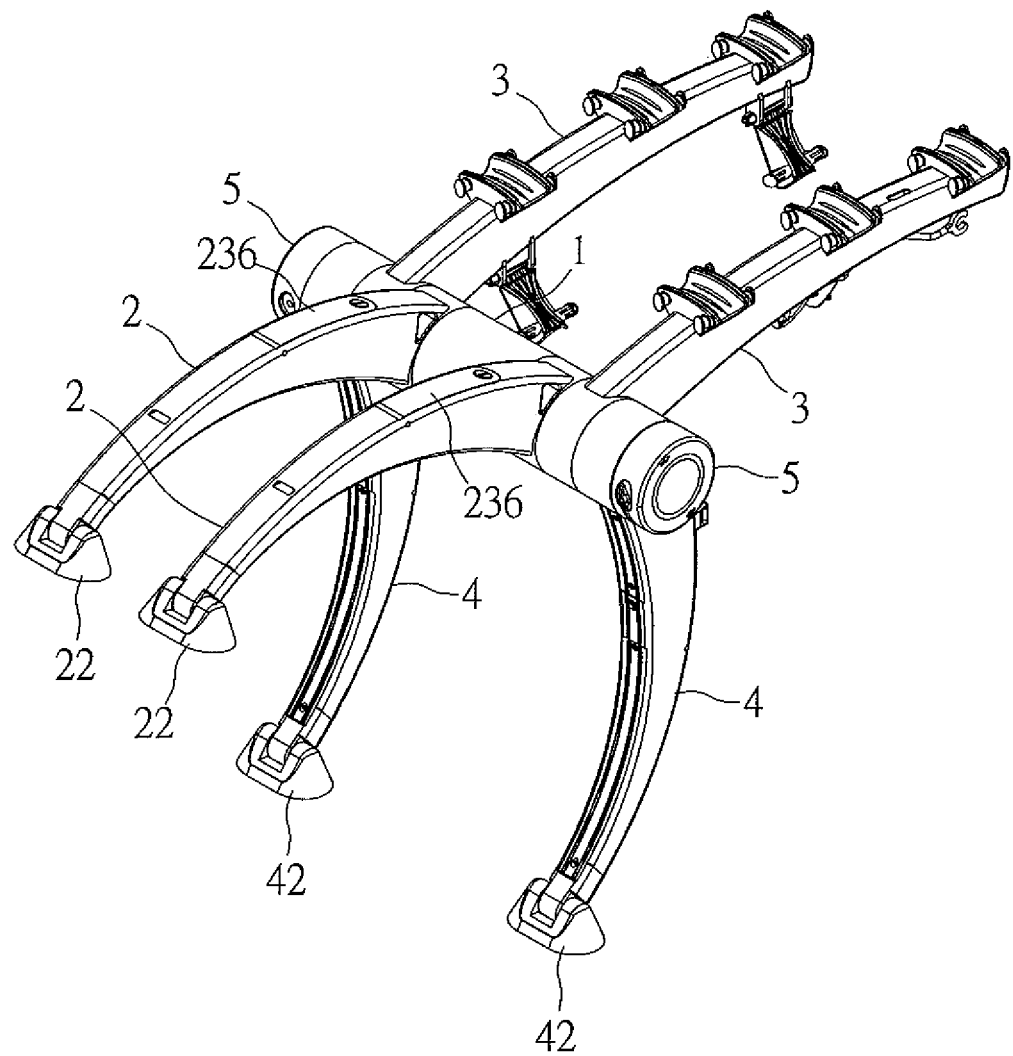
FIG. 1 is a perspective view of a bicycle carrier in accordance with the preferred embodiment of the present invention.
Figure 2:
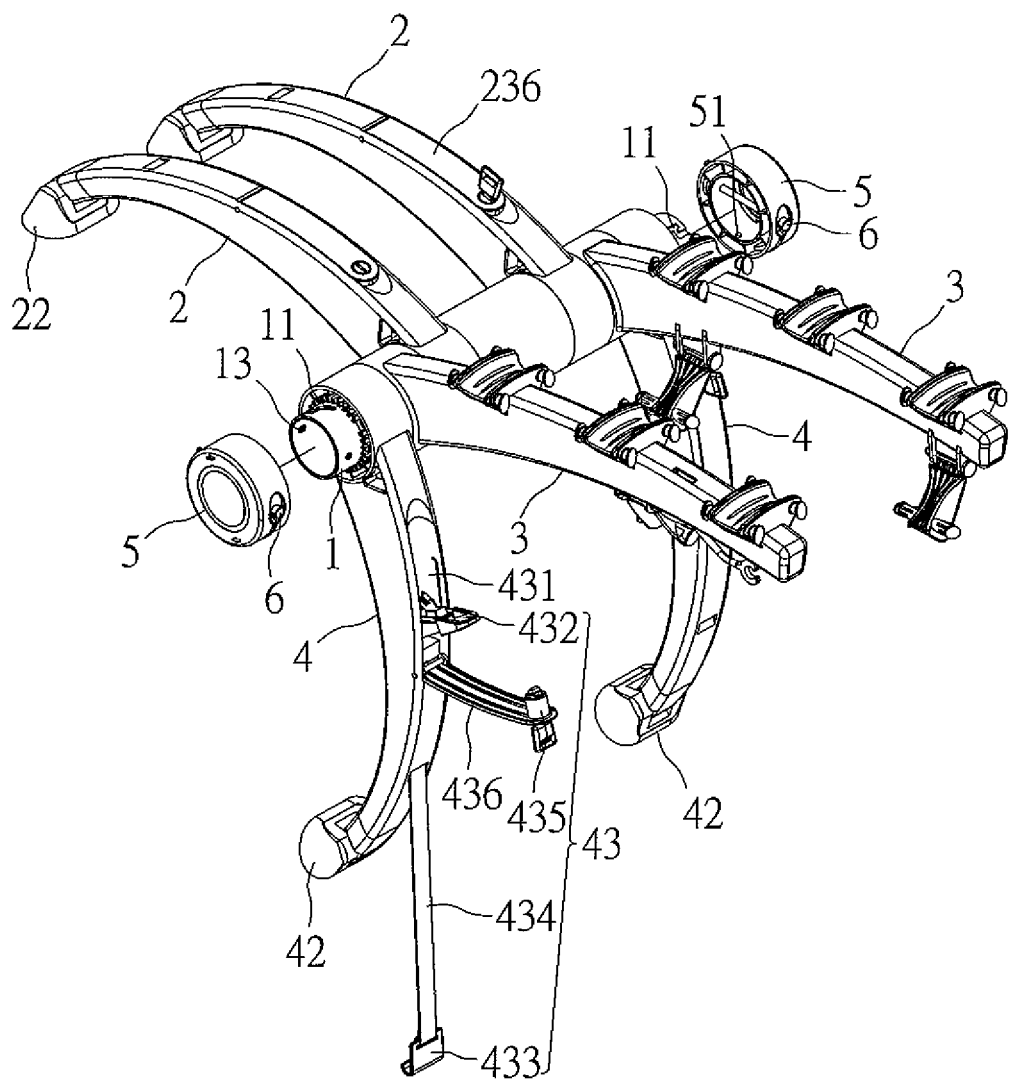
FIG. 2 is a partially exploded perspective view of the bicycle carrier in accordance with the preferred embodiment of the present invention.
Figure 3:
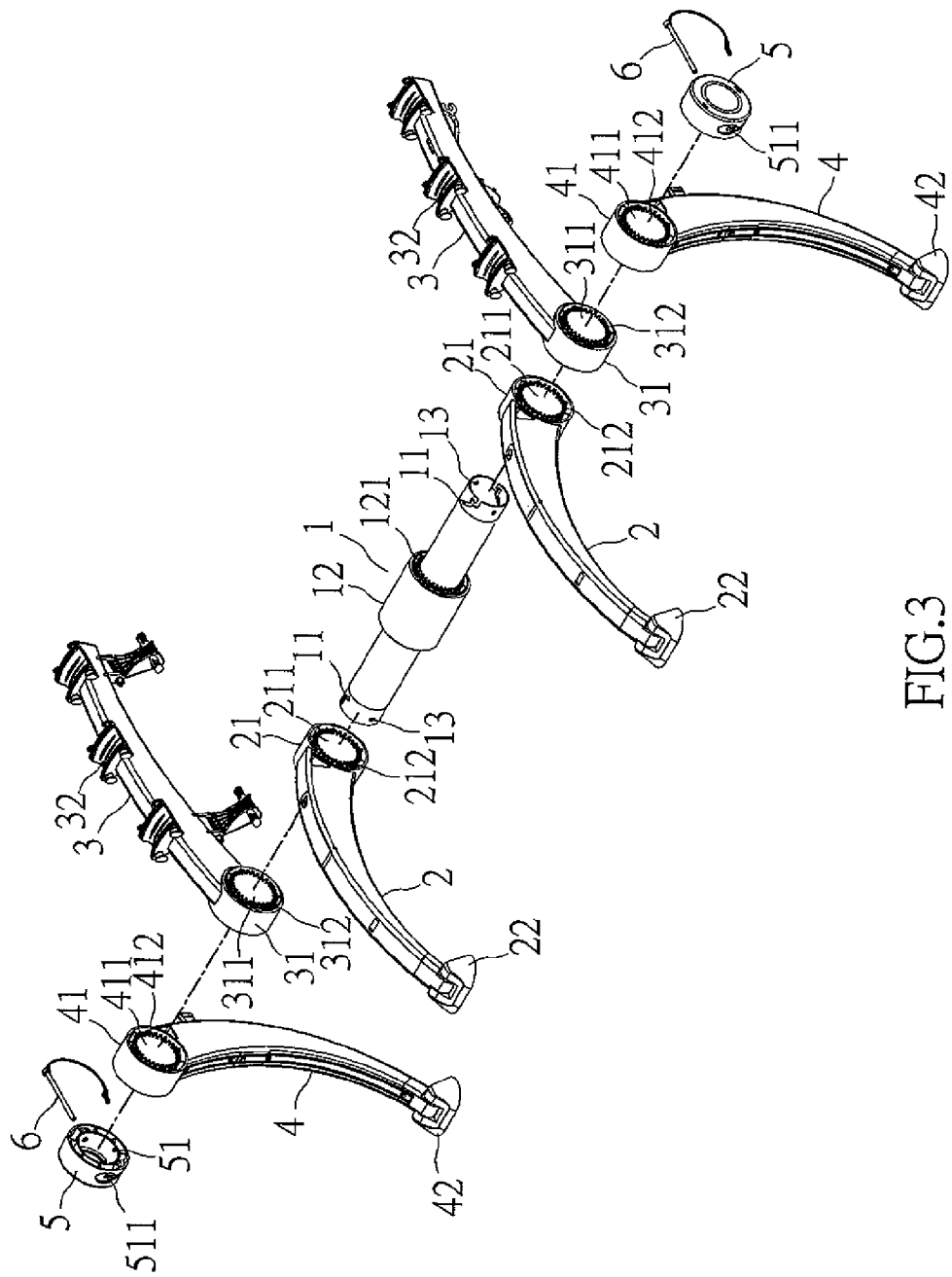
FIG. 3 is an exploded perspective view of the bicycle carrier as shown in FIG. 1.
Figure 4:
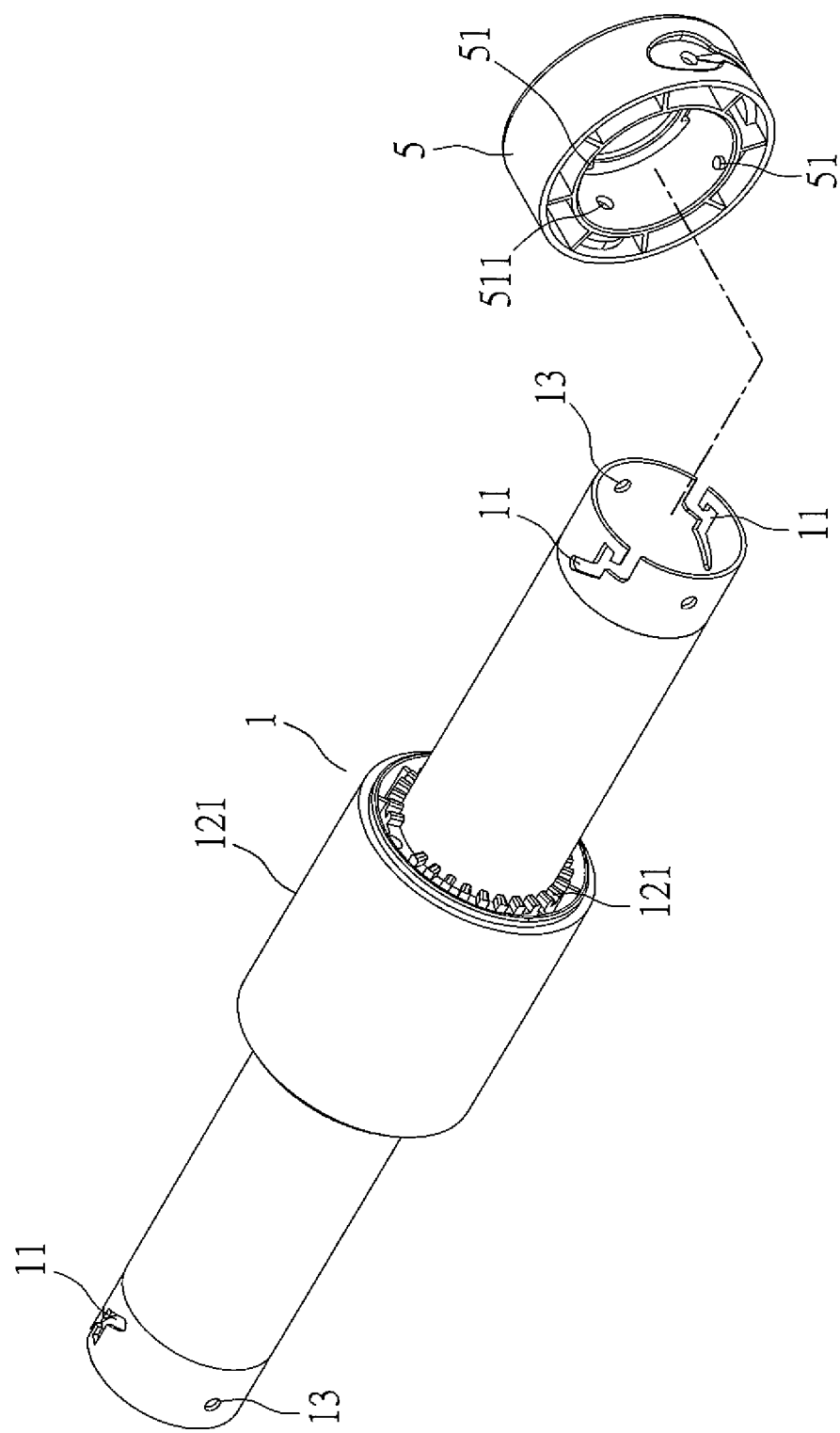
FIG. 4 is a locally enlarged view of the bicycle carrier as shown in FIG. 3.
Figure 5:
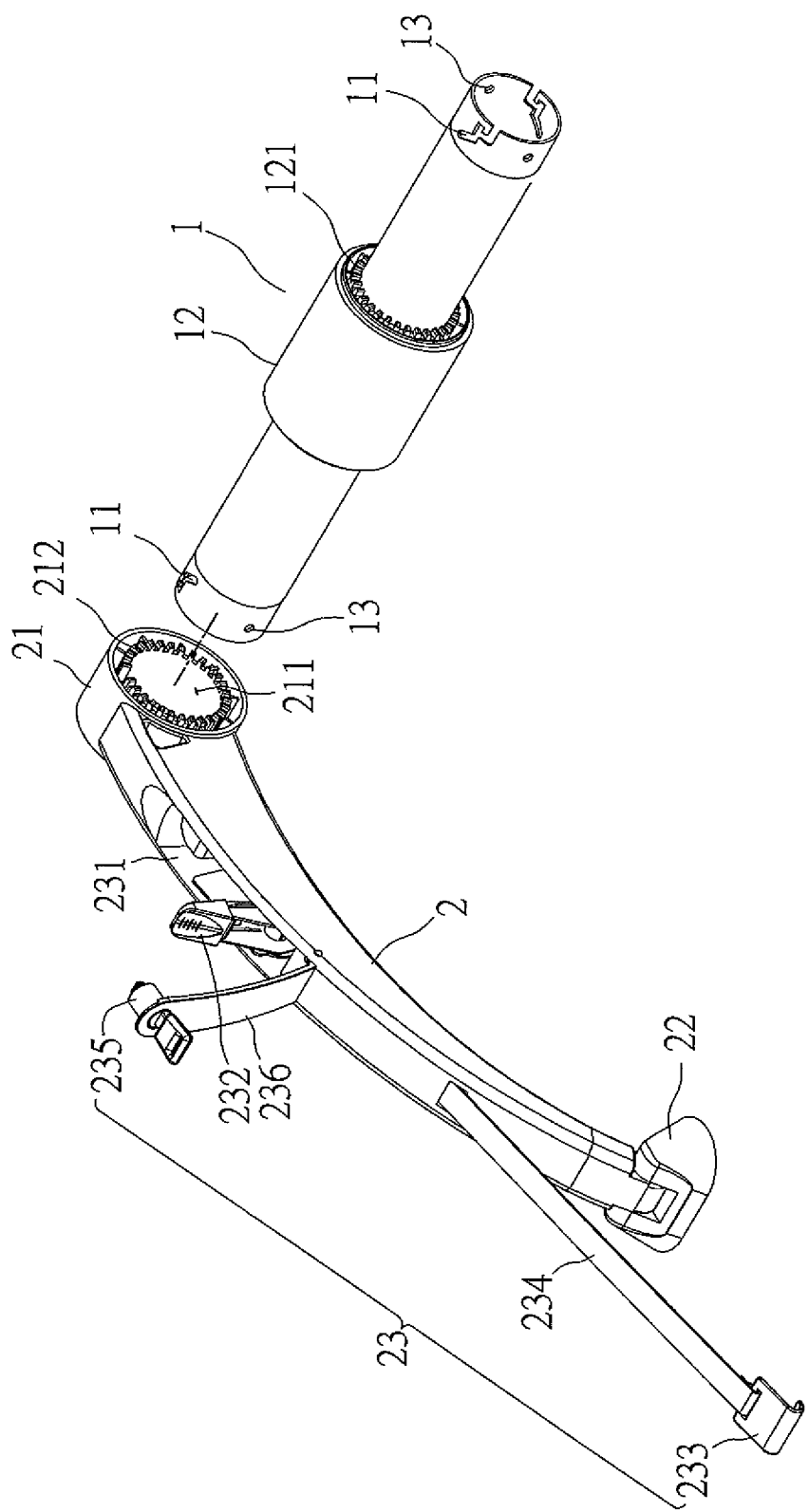
FIG. 5 is a locally enlarged view of the bicycle carrier as shown in FIG. 3.
Figure 6:
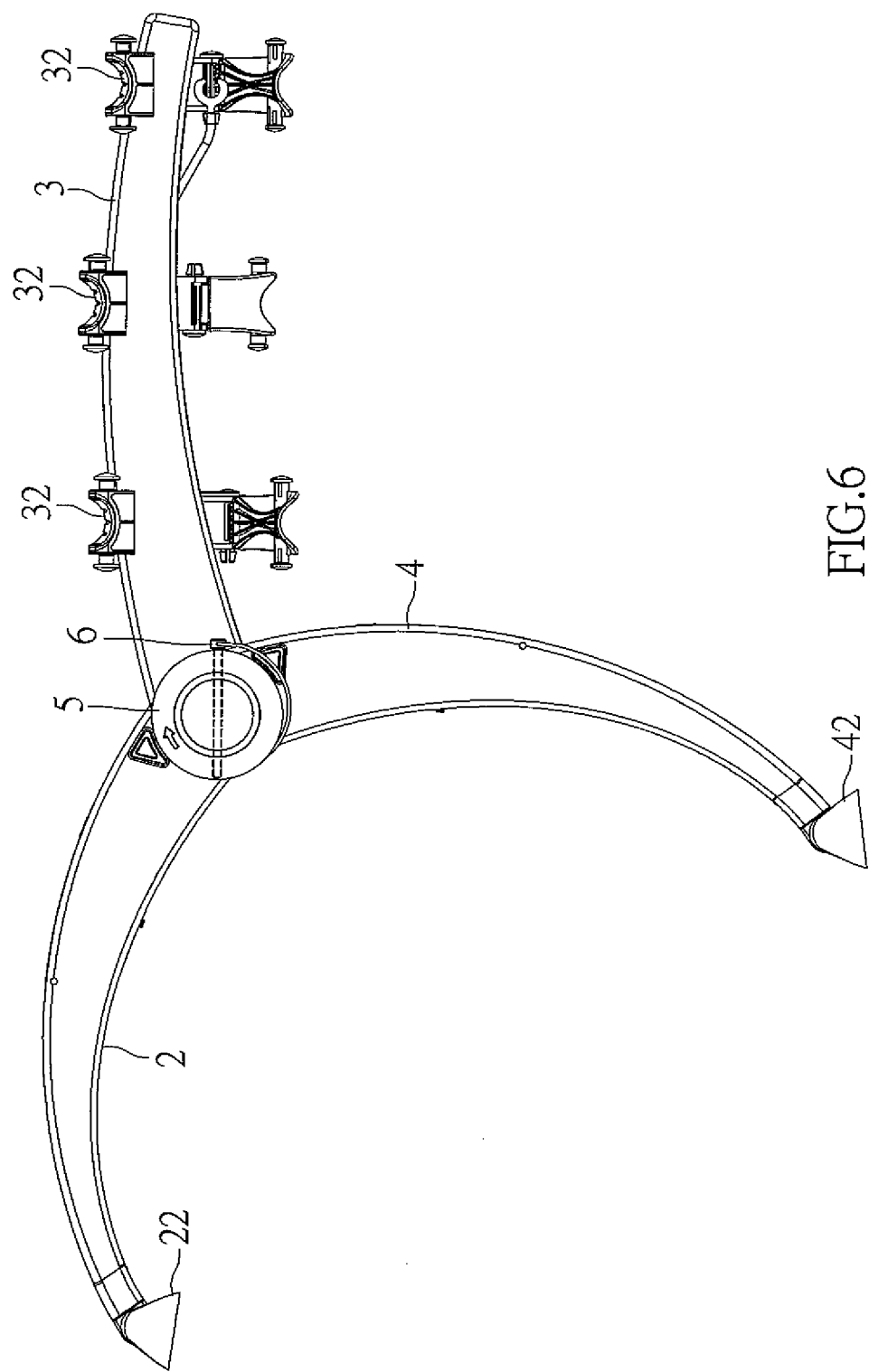
FIG. 6 is a side view of the bicycle carrier as shown in FIG. 1.

Referring to the drawings and initially to FIGS. 1-6, a bicycle carrier in accordance with the preferred embodiment of the present invention comprises a main shaft 1 having a middle section provided with a spacer 12, at least two upper stands 2 mounted on the main shaft 1 and abutting the spacer 12 of the main shaft 1, at least two carrying racks 3 mounted on the main shaft 1 and respectively abutting the at least two upper stands 2, at least two lower stands 4 mounted on the main shaft 1 and respectively abutting the at least two carrying racks 3, and at least two end caps 5 mounted on the main shaft 1 and respectively abutting the at least two lower stands 4.

The main shaft 1 is a hollow tube and has two ends each provided with two guiding grooves 11. The spacer 12 of the main shaft 1 has two ends each provided with a first ratchet ring 121.

Each of the at least two upper stands 2 has a first end provided with a first mounting ring 21, a second end provided with a first abutting portion 22, and a side provided with a first tightening unit 23. The first mounting ring 21 has an interior provided with a first through hole 211 mounted on the main shaft 1 and has two ends each provided with a second ratchet ring 212 corresponding to the respective first ratchet ring 121 of the spacer 12. Each of the at least two upper stands 2 is pivotally connected with the first abutting portion 22.

Each of the at least two carrying racks 3 has an end provided with a second mounting ring 31 and has a face provided with at least one carrying portion 32. The second mounting ring 31 has an interior provided with a second through hole 311 mounted on the main shaft 1 and has two ends each provided with a third ratchet ring 312 corresponding to the respective second ratchet ring 212 of the first mounting ring 21.

Each of the at least two lower stands 4 has a first end provided with a third mounting ring 41, a second end provided with a second abutting portion 42, and a side provided with a second tightening unit 43. The third mounting ring 41 has an interior provided with a third through hole 411 mounted on the main shaft 1 and has two ends each provided with a fourth ratchet ring 412 corresponding to the respective third ratchet ring 312 of the second mounting ring 31. Each of the at least two lower stands 4 is pivotally connected with the second abutting portion 42.

Each of the at least two end caps 5 has an interior provided with two projections 51 corresponding to the two respective guiding grooves 11 of each of the two ends of the main shaft 1.

In the preferred embodiment of the present invention, the first tightening unit 23 includes a first receiving chamber 231 formed in each of the at least two upper stands 2, a first cord winding arm 232 mounted in the first receiving chamber 231, a first pull cord 234 retractably mounted on each of the at least two upper stands 2 and having a distal end provided with a first hook portion 233, and a first cover 236 pivotally mounted on each of the at least two upper stands 2 and having a first lock core 235. The first cover 236 covers the first receiving chamber 231 to cover and hide the first cord winding arm 232 in the first receiving chamber 231.

In the preferred embodiment of the present invention, the second tightening unit 43 includes a second receiving chamber 431 formed in each of the at least two lower stands 4, a second cord winding arm 432 mounted in the second receiving chamber 431, a second pull cord 434 retractably mounted on each of the at least two lower stands 4 and having a distal end provided with a second hook portion 433, and a second cover 436 pivotally mounted on each of the at least two lower stands 4 and having a second lock core 435. The second cover 436 covers the second receiving chamber 431 to cover and hide the second cord winding arm 432 in the second receiving chamber 431.

In the preferred embodiment of the present invention, each of the two ends of the main shaft 1 is provided with two first pin holes 13 located between the two guiding grooves 11, each of the at least two end caps 5 is provided with two second pin holes 511 located between the two projections 51, and the bicycle carrier further comprises at least two positioning pins 6 extending through the respective two second pin holes 511 of each of the at least two end caps 5 and the respective two first pin holes 13 of each of the two ends of the main shaft 1.

In assembly, the first through hole 211 of the first mounting ring 21 of each of the at least two upper stands 2 is mounted on the main shaft 1. Then, the second through hole 311 of the second mounting ring 31 of each of the at least two carrying racks 3 is mounted on the main shaft 1. Then, the third through hole 411 of the third mounting ring 41 of each of the at least two lower stands 4 is mounted on the main shaft 1. Then, the two projections 51 of each of the at least two end caps 5 are inserted into the two respective guiding grooves 11 of each of the two ends of the main shaft 1. Then, each of the at least two end caps 5 is pushed toward and rotated relative to the main shaft 1 so that the two projections 51 of each of the at least two end caps 5 are moved from an outer terminal toward an inner terminal of the two respective guiding grooves 11 of each of the two ends of the main shaft 1. At this time, each of the at least two end caps 5 is pushed toward the spacer 12 of the main shaft 1 so that the first mounting ring 21 of each of the at least two upper stands 2, the second mounting ring 31 of each of the at least two carrying racks 3 and the third mounting ring 41 of each of the at least two lower stands 4 abut each other. In such a manner, the second ratchet ring 212 of the first mounting ring 21 of each of the at least two upper stands 2 engages the respective first ratchet ring 121 of the spacer 12 of the main shaft 1, the third ratchet ring 312 of the second mounting ring 31 of each of the at least two carrying racks 3 engages the respective second ratchet ring 212 of the first mounting ring 21, and the fourth ratchet ring 412 of the third mounting ring 41 of each of the at least two lower stands 4 engages the respective third ratchet ring 312 of the second mounting ring 31. Finally, when the two projections 51 of each of the at least two end caps 5 are moved to the inner terminal of the two respective guiding grooves 11 of each of the two ends of the main shaft 1, the at least two positioning pins 6 in turn extend through the respective two second pin holes 511 of each of the at least two end caps 5 and the respective two first pin holes 13 of each of the two ends of the main shaft 1 so that each of the at least two end caps 5 is locked onto the main shaft 1.

Figure 7:
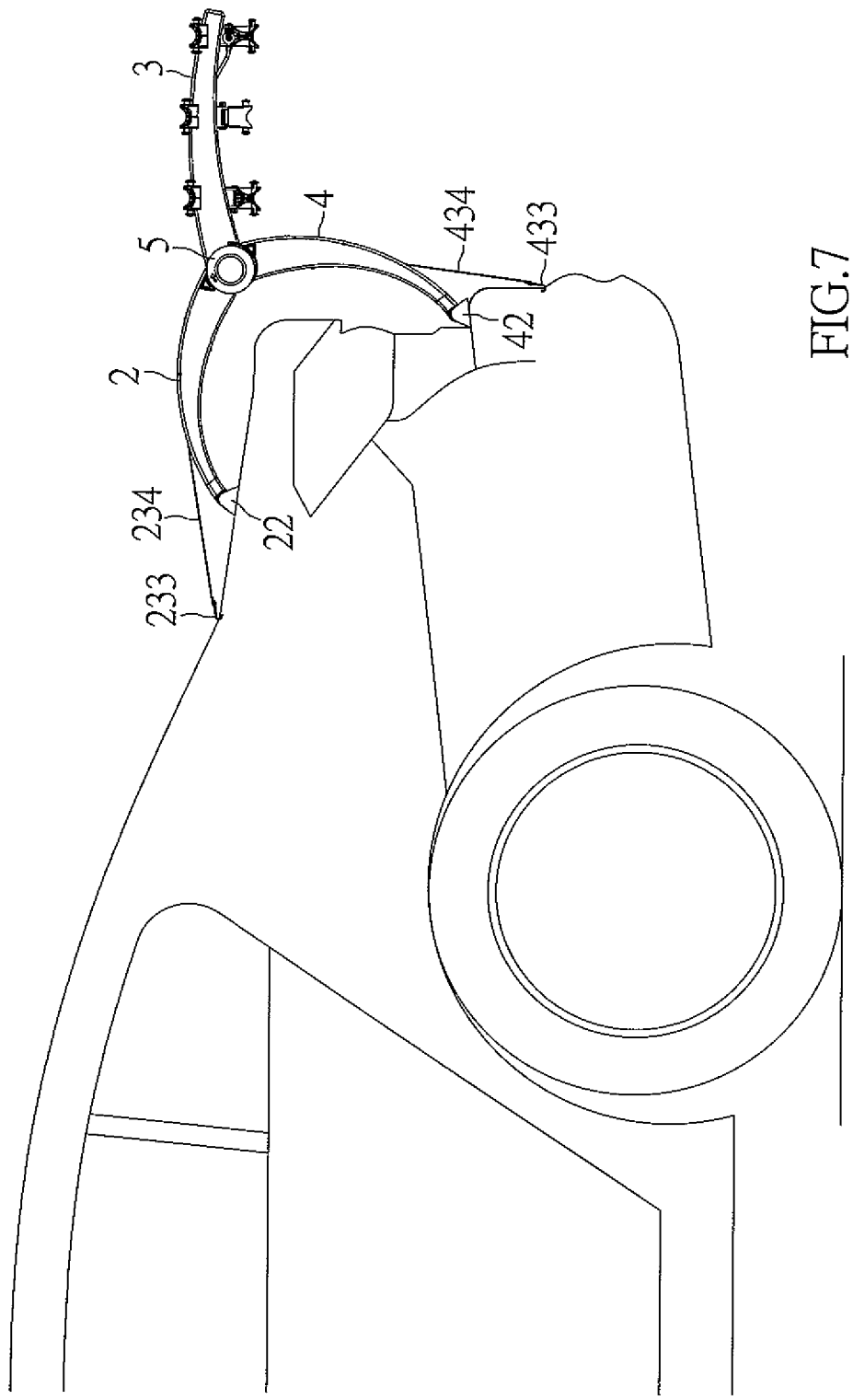
FIG. 7 is a schematic side operational view of the bicycle carrier for a sedan.

In operation, referring to FIGS. 7 and 8 with reference to FIGS. 1-6, the bicycle carrier is available for a car, such as a sedan as shown in FIG. 7 or a sport utility vehicle (SUV) as shown in FIG. 8. When the bicycle carrier is mounted on the car, the first abutting portion 22 and the first hook portion 233 of the first pull cord 234 of each of the at least two upper stands 2 are placed on an upper portion of the trunk, and the second abutting portion 42 and the second hook portion 433 of the second pull cord 434 of each of the at least two lower stands 4 are placed on a lower portion of the trunk, so that the bicycle carrier is secured on the trunk of the car. Thus, the at least two carrying racks 3 protrude outward from the trunk of the car for carrying bicycles.

Accordingly, the spacer 12 of the main shaft 1, the first mounting ring 21 of each of the at least two upper stands 2, the second mounting ring 31 of each of the at least two carrying racks 3 and the third mounting ring 41 of each of the at least two lower stands 4 engage each other to enhance the structural strength of the bicycle carrier, so that the bicycle carrier can withstand a larger load. In addition, the first mounting ring 21 of each of the at least two upper stands 2, the second mounting ring 31 of each of the at least two carrying racks 3 and the third mounting ring 41 of each of the at least two lower stands 4 have the same structure so that the bicycle carrier has a simplified construction, thereby decreasing the cost of fabrication and production, and thereby decreasing the working time of assembly. Further, the clamping angle between each of the at least two upper stands 2 and each of the at least two lower stands 4 can be adjusted to conform to the shape of the trunk of the car, thereby enhancing the versatility of the bicycle carrier. Further, the two projections 51 of each of the at least two end caps 5 are inserted into the two respective guiding grooves 11 of each of the two ends of the main shaft 1, so that the spacer 12 of the main shaft 1, the first mounting ring 21 of each of the at least two upper stands 2, the second mounting ring 31 of each of the at least two carrying racks 3 and the third mounting ring 41 of each of the at least two lower stands 4 abut and engage each other. Further, the at least two positioning pins 6 in turn extend through the respective two second pin holes 511 of each of the at least two end caps 5 and the respective two first pin holes 13 of each of the two ends of the main shaft 1 so that each of the at least two end caps 5 is locked onto and will not be detached from the main shaft 1. Further, the first ratchet ring 121 of the spacer 12 of the main shaft 1, the second ratchet ring 212 of the first mounting ring 21 of each of the at least two upper stands 2, the third ratchet ring 312 of the second mounting ring 31 of each of the at least two carrying racks 3 and the fourth ratchet ring 412 of the third mounting ring 41 of each of the at least two lower stands 4 engage each other, so that each of the at least two upper stands 2, each of the at least two carrying racks 3 and each of the at least two lower stands 4 are positioned on the main shaft 1 solidly and stably. Further, the first tightening unit 23 of each of the at least two upper stands 2 and the second tightening unit 43 of each of the at least two lower stands 4 affix the bicycle carrier to the trunk of the car. Further, the first pull cord 234 of the first tightening unit 23 and the second pull cord 434 of the second tightening unit 43 are respectively hidden in each of the at least two upper stands 2 and each of the at least two lower stands 4 when not in use. Further, the first cord winding arm 232 of the first tightening unit 23 and the second cord winding arm 432 of the second tightening unit 43 respectively fasten the first pull cord 234 and the second pull cord 434, so that the bicycle carrier is positioned exactly. Further, the bicycle carrier is attached to the trunk of the car easily and quickly, thereby saving the energy and working time.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A bicycle carrier comprising:
a main shaft having a middle section provided with a spacer;
at least two upper stands mounted on the main shaft and abutting the spacer of the main shaft;
at least two carrying racks mounted on the main shaft and respectively abutting the at least two upper stands;
at least two lower stands mounted on the main shaft and respectively abutting the at least two carrying racks; and
at least two end caps mounted on the main shaft and respectively abutting the at least two lower stands;
wherein:
the main shaft is a hollow tube and has two ends each provided with two guiding grooves;
the spacer of the main shaft has two ends each provided with a first ratchet ring;
each of the at least two upper stands has a first end provided with a first mounting ring, a second end provided with a first abutting portion, and a side provided with a first tightening unit;
the first mounting ring has an interior provided with a first through hole mounted on the main shaft and has two ends each provided with a second ratchet ring corresponding to the respective first ratchet ring of the spacer;
each of the at least two carrying racks has an end provided with a second mounting ring and has a face provided with at least one carrying portion;
the second mounting ring has an interior provided with a second through hole mounted on the main shaft and has two ends each provided with a third ratchet ring corresponding to the respective second ratchet ring of the first mounting ring;

each of the at least two lower stands has a first end provided with a third mounting ring, a second end provided with a second abutting portion, and a side provided with a second tightening unit;

the third mounting ring has an interior provided with a third through hole mounted on the main shaft and has two ends each provided with a fourth ratchet ring corresponding to the respective third ratchet ring of the second mounting ring;

each of the at least two end caps has an interior provided with two projections corresponding to the two respective guiding grooves of each of the two ends of the main shaft;

each of the two ends of the main shaft is provided with two first pin holes located between the two guiding grooves;

each of the at least two end caps is provided with two second pin holes located between the two projections; and the bicycle carrier further comprises at least two positioning pins extending through the respective two second pin holes of each of the at least two end caps and the respective two first pin holes of each of the two ends of the main shaft.

2. The bicycle carrier of claim 1, wherein:
the first tightening unit includes:
a first receiving chamber formed in each of the at least two upper stands;
a first cord winding arm mounted in the first receiving chamber;
a first pull cord retractably mounted on each of the at least two upper stands and having a distal end provided with a first hook portion; and
a first cover pivotally mounted on each of the at least two upper stands and having a first lock core; and
the first cover covers the first receiving chamber to cover and hide the first cord winding arm in the first receiving chamber.

3. The bicycle carrier of claim 1, wherein:
the second tightening unit includes:
a second receiving chamber formed in each of the at least two lower stands;
a second cord winding arm mounted in the second receiving chamber;
a second pull cord retractably mounted on each of the at least two lower stands and having a distal end provided with a second hook portion; and
a second cover pivotally mounted on each of the at least two lower stands and having a second lock core; and
the second cover covers the second receiving chamber to cover and hide the second cord winding arm in the second receiving chamber.

4. The bicycle carrier of claim 1, wherein each of the at least two upper stands is pivotally connected with the first abutting portion.

5. The bicycle carrier of claim 1, wherein each of the at least two lower stands is pivotally connected with the second abutting portion.

* * * * *